United States Patent Office 3,583,951
Patented June 8, 1971

3,583,951
POLYMERIZATION PROCESS FOR
DODECANOLACTAM
Harry McGrath, Manchester, England, assignor to Imperial Chemical Industries Limited, London, England
No Drawing. Filed Feb. 6, 1969, Ser. No. 797,247
Claims priority, application Great Britain, Feb. 12, 1968,
6,816/68
Int. Cl. C08g 20/10
U.S. Cl. 260—78                            14 Claims

ABSTRACT OF THE DISCLOSURE

Manufacture of polydodecanolactam by heating dodecanolactam with an organic phosphonic acid and a co-catalyst consisting of a carbonate ester or an N-acetyllactam, particularly N-acetyldodecanolactam. If desired monofunctional compounds acting as chain stoppers can also be used, e.g. monomasic carboxylic acids or N-substituted amides.

---

This invention relates to a process for the polymerization of dedecanolactam.

In British specification No. 1,084,325 there is described and claimed a process for the manufacture of polyamides which comprises polymerizing a lactam having a ring of from 7 to 13 atoms (which includes dodecanolactam) in the presence of a phosphonic acid of the formula:

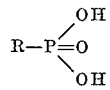

wherein R is a monovalent organic radical which is attached to the phosphorus atom through a carbon atom of said radical.

It has now been found that if the above process for the polymerization of dodecanolactam is carried out in the additional presence of a small amount of a carbonate ester or an N-acetyl lactam, the polymerization can be effected in shorter time and/or at a lower temperature without adversely affecting the yield of the polymer.

According to the invention an improved process for the manufacture of polydodecanolactam comprises polymerizing dodecanolactam in the presence of a catalytic amount of an organic phosphonic acid and additionally a catalytic amount of a carbonate ester or an N-acetyl lactam.

Suitable amounts of the organic phosphonic acid are for example from 0.001 to 3.0% by weight of the dodecanolactam, and preferably from 0.1 to 1.0% by weight.

Phosphonic acids are of the formula:

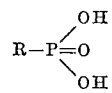

wherein R is a monovalent organic radical which is attached to the phosphorus atom through a carbon atom of said radical. R is preferably an alkyl radical in particular a lower alkyl radical of from 1 to 4 carbon atoms, or a cycloalkyl, an aralkyl, or a monocyclic aryl radical. As specific examples of the said acids there may be mentioned methylphosphonic acid, ethylphosphonic acid, cyclohexylphosphonic acid, benzylphosphonic acid and phenylphosphonic acid.

Suitable amounts of the carbonate ester or N-acetyl lactam are for example from 0.1 to 1.0% by weight of the dodecanolactam, and preferably 0.25 to 1.0% by weight.

As examples of the said N-acetyl lactams there may be mentioned N-acetyl caprolactam and N-acetyldodecanolactam. If desired N-acetyldodecanolactam can be formed in situ from dodecanolactam by adding a small amount of an acetylating agent, for example acetic anhydride, which reacts with a minor proportion of the dodecanolactam.

Carbonate esters are of the formula:

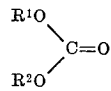

wherein $R^1$ and $R^2$ each independently represent monovalent organic radicals which are attached to the oxygen atom through a carbon atom of said radical. These radicals preferably have the preferred values of R as set out above. As specific examples of the said esters there may be mentioned diphenylcarbonate, dimethylcarbonate, methylethyl carbonate and di-n-butylcarbonate.

The polymerization process can be carried out under the conditions which are conventionally used for polymerizing dodecanolactam, particularly the conditions described in United Kingdom specification No. 1,084,225.

Thus the process may be carried out for example in presence of water and at temperatures of 280° to 300° C., if desired in a closed vessel. It is desirable for the heating to be carried out under an oxygen-free atmosphere, for example under nitrogen or carbon dioxide to avoid discolouration of the polymer. Alternatively, the polymerization process may be carried out under anhydrous conditions for example in a vessel from which all air and water have been removed by boiling a suitable solvent, e.g. toluene, in the vessel, or by evacuating the vessel and flushing with inert gas, e.g. nitrogen. Temperatures of 250–280° C. may be used for the polymerization under anhydrous conditions.

If desired polymerization may be carried out by the process of the invention in the presence of monofunctional compounds which, by acting as chain stoppers control the molecular weight of the product. Monobasic carbonic acids, e.g. acetic acid or stearic acid may be used. Certain amides may also be used as mono functional compounds, as will be indicated below.

When polymerization has been effected the product may be washed with water or methanol to remove unreacted monomer and catalysts.

According to a further feature of the invention a preferred process for the manufacture of polydodecanolactam comprises heating dodecanolactam in the presence of a catalytic amount of an organic phosphonic acid, additionally a catalytic amount of a carbonate ester or an N-acyl lactam, and an N-substituted amide, especially an N-substituted amide of the formula:

$$R_3CONHR_4$$

wherein $R_3$ and $R_4$ each represent alkyl, cycloalkyl or aryl radicals and may be the same or different.

Examples of aryl radicals which may be represented by $R_3$ in the above formula are phenyl, p-tolyl and β-naphthyl. Similarly examples of alkyl radicals are methyl, ethyl, n-propyl, n-butyl and an example of a cycloalkyl radical is cyclohexyl.

Specific examples of amides of the above formula include acetanilide, benzanilide, N-butylbenzamide and N-acetylbutylamine.

Especially preferred amides are those in which one of the radicals $R_3$ and $R_4$ is an aryl radical, the other being aryl, alkyl (especially lower alkyl, that is to say an alkyl radical of not more than 5 carbon atoms) or cycloalkyl.

In the preferred process of our invention the amide acts as a chain stopper and effectively controls the degree of polymerization which is achieved. To produce polydodecanolactam suitable for spinning into fibres, or for use as a moulding material, the amount of amide used should be from 1.0 to 5.0 moles (preferably from 0.25 to 1.5) percent of the dodecanolactam. Higher amounts of amide reduce the molecular weight of the polydodecanolactam so much that the product is no longer useful for the production of fibres, and lower amounts lead to products of such high molecular weights as to cause extrusion difficulties.

As a measure of the degree of polymerization produced by the process of the invention, we have relied upon determinations of the relative viscosity of a 1% by weight solution of the methanol-extracted polymer in m-cresol at 25°. In order for polydodecanolactam to be useful for spinning into fibres it is desirable that the relative viscosity of the methanol-extracted polymer in m-cresol should be within the range 1.8 to 3.4 and that the percentage by weight of methanol-extractable material in the crude polymer should be less than 5%, preferably less than 1%.

If desired the process can be carried out in the presence of delustrants, in particular titanium oxide, fillers, heat stabilizers and/or light stabilizers.

The process of the invention results in the production of polyamides in much higher yield than are obtained by carrying out the polymerization of the dodecanolactam in the presence of only the organic phosphonic acid. Moreover the present process is particularly advantageous in that it enables the polymerization of dodecanolactam to be effected, in good yield, at lower temperatures and/or for shorter heating periods than are required in the prior art process, thus resulting in the formation of polyamides containing less degraded material, which is produced by heating polyamides for prolonged periods at high temperatures.

The invention is illustrated but not limited by the following examples in which the parts and percentages are by weight:

EXAMPLE 1

70 parts of dodecanolactam, 0.2 part of acetic anhydride, 0.35 part of cyclohexylphosphonic acid and 5 parts of water are charged to a reaction tube, and the air is then displaced by nitrogen. The contents of the reaction tube are then stirred for 5 hours at 250° C., and the resulting polydodecanolactam is then discharged from the reaction tube. The yield of polydodecanolactam is 75%. It has a relative viscosity of 2.1 (when measured as 1% solution in m-cresol at 25° C.).

When the 0.2 part of acetic anhydride is omitted from the reaction tube the yield of polydodecanolactam is only 8%.

EXAMPLE 2

Example 1 is repeated, using 0.35 part of methylphosphonic acid in place of the cyclohexylphosphonic acid, the mixture being stirred for 4 hours at 260° C. The yield of polydodecanolactam is 95%. It has a relative viscosity of 2.5 (1% solution in m-cresol at 25° C.).

Using 0.35 part of phenylphosphonic acid the yield is 90% of polydodecanolactam having a relative viscosity of 2.3.

Benzylphosphonic acid can be used in similar manner.

EXAMPLE 3

Example 1 is repeated using 0.35 part of N-acetyldodecanolactam in place of the acetic anhydride. The yield is 84% of polydodecanolactam having a relative viscosity of 2.2 (1% solution in m-cresol at 25° C.).

N-acetylcaprolactam may be used in place of N-acetyldodecanolactam.

EXAMPLE 4

Example 1 is repeated using 0.35 part of diphenylcarbonate in place of the acetic anhydride. The yield is 86% of polydodecanolactam having a relative viscosity of 2.2 (1% solution in m-cresol at 25° C.).

By heating at 270° C. for 3 hours a 98% yield of polydodecanolactam is obtained with a relative viscosity of 2.8.

EXAMPLE 5

Example 1 is repeated using 0.35 part of di-n-butylcarbonate in place of the acetic anhydride, and heating at 265° C. for 4 hours. The yield of polydodecanolactam is 96%. It has a relative viscosity of 2.5 (1% solution m-cresol at 25° C.).

Dimethylcarbonate, dibenzylcarbonate or dicyclohexylcarbonate may be used in place of di-n-butylcarbonate.

EXAMPLE 6

70 parts of dodecanolactam, 40 parts of toluene, 0.7 part of cyclohexylphosphonic acid, 0.35 part of acetic anhydride and 0.4 part of stearic acid are heated for 4 hours at 275°–280° C. The yield of polydodecanolactam is 98%. Its relative viscosity is 2.84 (1% solution in m-cresol at 25° C.).

Stearic acid in this example acts as a chain stopper. In its place there may be used acetanilide, n-butylbenzamide, benzanilide or benzoylpiperidine.

We claim:
1. A process for the manufacture of fiber forming or moldable polydodecanolactam which comprises heating dodecanolactam with from 0.01 to 3.3% of its weight of a catalyst comprising an organic phosphonic acid having the formula:

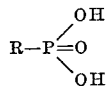

wherein R represents an alkyl, cycloalkyl, aralkyl or monocyclic aryl radical, and from 0.1 to 1.0% of its weight of a cocatalyst selected from the class consisting of N-acetyl lactam and a carbonate ester having the formula:

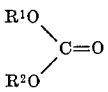

wherein $R^1$ and $R^2$ each independently represent alkyl, cycloalkyl, aralkyl or monocyclic aryl radicals.

2. Process according to claim 1 wherein the amount of co-catalyst is from 0.25 to 1.0% of the weight of the dodecanolactam.

3. Process according to claim 1 wherein the N-acetyl lactam is N-acetyldodecanolactam.

4. Process according to claim 3 wherein the N-acetyldodecanolactam is formed in situ from dodecanolactam by adding acetic anhydride.

5. Process according to claim 1 wherein the carbonate ester is diphenyl carbonate.

6. Process according to claim 1 wherein the carbonate ester is di-n-butyl carbonate.

7. Process according to claim 1 carried out in the presence of water and at a temperature of from 280° to 300° C.

8. Process according to claim 1 carried out under anhydrous conditions and at a temperature of from 250° to 280° C.

9. Process according to claim 1 carried out in the presence from 0.1 to 1.5 moles percent of a monofunctional compound which functions as a chain stopper said compound being selected from the class consisting of monobasic carboxylic acids and N-substituted amides of the formula:

wherein $R_3$ and $R_4$ each independently represent alkyl cycloalkyl or aryl radicals.

10. Process according to claim 7 carried out in the presence from 0.1 to 1.5 moles percent of a monofunctional compound which functions as a chain stopper said compound being selected from the class consisting of monobasic carboxylic acids and N-substituted amides of the formula:

wherein $R_3$ and $R_4$ each independently represent alkyl, cycloalkyl, or aryl radicals and may be the same or different.

11. Process according to claim 8 carried out in the presence from 0.1 to 1.5 moles percent of a monofunctional compound which functions as a chain stopper said compound being selected from the class consisting of monobasic carboxylic acids and N-substituted amides of the formula:

$$R_3CONHR_4$$

wherein $R_3$ and $R_4$ each represent alkyl, cycloalkyl or aryl radicals and may be the same or different.

12. Process according to claim 9 wherein the monofunctional compound which functions as a chain stopper is selected from the class consisting of acetic acid, stearic acid, acetanilide, benzanilide, N-butylamide, or N-acetylbutylamide.

13. Process according to claim 10 wherein the monofunctional compound which functions as a chain stopper is selected from the class consisting of acetic acid, stearic acid, acetanilide, benzanilide, N-butylamide, or N-acetylbutylamide.

14. Process according to claim 11 wherein the monofunctional compound which functions as a chain stopper is selected from the class consisting of acetic acid, stearic acid, acetanilide, benzanilide, N-butylamide, or N-acetylbutylamide.

References Cited
UNITED STATES PATENTS

| | | | |
|---|---|---|---|
| 3,321,447 | 5/1967 | Kunde et al. | 260—78 |
| 3,376,258 | 4/1968 | Gysling et al. | 260—78X |

WILLIAM H. SHORT, Primary Examiner

L. M. PHYNES, Assistant Examiner